United States Patent [19]

Namikoshi et al.

[11] Patent Number: 4,617,385

[45] Date of Patent: Oct. 14, 1986

[54] QUATERNARY AMMONIUM SALTS OF CARBOXYMETHYLCELLULOSE

[75] Inventors: Hajime Namikoshi; Takeo Ohmiya, both of Himeji, Japan

[73] Assignee: Daicel Chemical Industries Ltd., Osaka, Japan

[21] Appl. No.: 748,775

[22] Filed: Jun. 25, 1985

[30] Foreign Application Priority Data

Jul. 3, 1984 [JP] Japan .................. 59-138697

[51] Int. Cl.$^4$ .................. C08B 15/06; C08B 11/00
[52] U.S. Cl. .................. 536/98; 536/43; 106/197.2
[58] Field of Search .................. 536/98, 43

[56] References Cited

U.S. PATENT DOCUMENTS

| | | | |
|---|---|---|---|
| 2,853,414 | 9/1958 | Wimmer | 536/98 |
| 2,881,074 | 4/1959 | Harwood | 424/78 |
| 2,972,606 | 2/1961 | Hartman et al. | 536/43 |
| 4,443,595 | 4/1984 | Namikoshi et al. | 536/98 |
| 4,520,192 | 5/1985 | Namikoshi | 536/66 |

Primary Examiner—Ronald W. Griffin
Attorney, Agent, or Firm—Stiefel, Gross, Kurland & Pavane

[57] ABSTRACT

A quaternary ammonium salt of carboxymethylcellulose having the formula

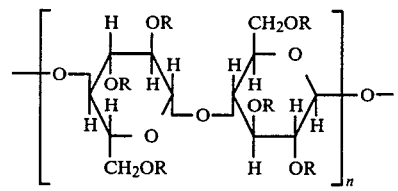

wherein R is a hydrogen atom or a quaternary ammonio carboxymethyl group, and n is an integer from 10 to 1000, provided that a degree of substitution by carboxymethyl group per anhydrous glucose unit in said carboxymethylcellulose is 1.5 or more.

10 Claims, 13 Drawing Figures

QUATERNARY AMMONIUM SALTS OF CARBOXYMETHYLCELLULOSE

BACKGROUND OF THE INVENTION

1. Field of the Invention

The present invention relates to quaternary ammonium salts of carboxymethylcellulose. Particularly it relates to those wherein a degree of substitution by carboxymethyl group per anhydrous glucose unit of carboxymethylcellulose (hereinafter referred to as "DS") is from 1.5 or more.

2. Description of the Prior Art

As quaternary ammonium salts of carboxymethylcellulose (hereinafter referred to as "CMC") there have been known the dimethyllaurylcetylammonium salt (West German Pat. No. 1,103,336), trimethyloctadecylammonium salt (U.S. Pat. No. 2,881,074), dodecyldimethyl(3,4-dichlorobenzyl) ammonium salt [Deut. Apotheker-Ztg., 106 (35), 1206-8 (1966)], tetradecylpyridinium salt and cetyltrimethylammonium salt [Pham. Ind., 37, (2), 100, (1976)].

These quaternary ammonium salts of CMC are used to utilize the characteristic properties of the CMC moiety as a soluble high molecular substance as well as the quaternary ammonium moiety. However, DS of CMCs of the above prior salts is believed to be 1.0 or less judging from DS of the commercially available products, while the content of the quaternary ammonium moiety is obliged to be 1.0 or less molecule per anhydrous glucose unit of CMC from the theoretical viewpoint that the quaternary ammonium group can be combined with the carboxymethyl group in the ratio of 1:1. This means that it can not be expected to utilize the characteristic property of the quaternary ammonium moiety to be exerted when it exists in more than 1.0 molecule per anhydrous glucose unit of CMC.

In these known quaternary ammonium salts of CMC, when the molecular weight of the quaternary ammonium moiety is low (e.g., lower alkyl substituted ammonium moiety), they are soluble in water but insoluble in organic solvents, and when it is high, they become insoluble in water and sparingly soluble in polar solvents such as alcohols and acetone and in non-polar solvents such as toluene. Therefore, these salts could not be used for usages to be in the form of solution in organic solvents.

SUMMARY OF THE INVENTION

The present invention provides a quaternary ammonium salt of carboxymethylcellulose having the formula:

wherein R is a hydrogen atom or a quaternary ammonio carboxymethyl group, and n is an integer from 10 to 1000, provided that a degree of substitution by carboxymethyl group per anhydrous glucose unit in said carboxymethylcellulose is 1.5 or more and the quaternary ammonio carboxymethyl group has the subformula:

where (i) $R^1$-$R^4$ are each a $C_{1-20}$ straight chained or branched and saturated or unsaturated aliphatic hydrocarbon group, (ii) three of $R^1$-$R^4$ are each said hydrocarbon, and the remaining one is an aralkyl group, or trialkylammoniumalkyl group, (iii) two of $R^1$-$R^4$ are said hydrocarbon group and the remaining two are an aralkyl group and mono or dialkylphenoxyalkyleneoxy alkyl group, or (iv) one or two of $R^1$-$R^4$ are said hydrocarbon group and the remaining two or three form a ring together with an adjacent nitrogen atom.

BRIEF DESCRIPTION OF THE DRAWINGS

FIG. 1: Laurylpyridinium CMC
FIG. 2: Tetradecyldimethylbenzylammonium CMC
FIG. 3: Lauryltrimethylammonium CMC
FIG. 4: Trioctylmethylammonium CMC
FIG. 5: Tetra-n-butylammonium CMC
FIG. 6: Stearyltrimethylammonium CMC
FIG. 7: Dimethyldistearylammonium CMC
FIG. 8: Benzethonium CMC
FIG. 9: Methylbenzethonium CMC
FIG. 10: Cetylpyridinium CMC
FIG. 11: Hexamethonium CMC
FIG. 12: Decamethonium CMC
FIG. 13: CMC sodium (DS=2.41, DP=480)

DETAILED DESCRIPTION OF THE PREFERRED EMBODIMENTS

In the quaternary ammonium salts of CMC of the present invention, the quaternary ammonium group of the subformula:

includes groups as follows:

(i) the groups wherein $R^1$-$R^4$ are a $C_{1-20}$ straight chained or branched and saturated or unsaturated aliphatic hydrocarbon: tetramethylammonium, tetraethylammonium, tetra-n-propylammonium, tetraisopropylammonium, tetra-n-butyl ammonium, tetra-n-amylammonium, lauryltrimethylammonium, stearyltrimethylammonium, trioctylmethylammonium, dimethyl distearylammonium, dimethyloleyllinoleylammonium, methyl trilaurylammonium or the like, (ii) the groups wherein three of $R^1$-$R^4$ are said aliphatic hydrocarbon group and the remaining one is an aryl, aralkyl, acyloxyalkyl, hydroxyalkyl or trialkyl ammonium alkyl group:
triethylbenzylammonium, tri-n-propylbenzylammonium, tri-n-butylbenzylammonium, tetradecyldimethylbenzylammonium, triethylphenylammonium, β-acetyloxyethyltrimethylammonium, β-hydroxyethyltrimethylammonium, laurylphenoxyethyldimethyl ammonium, hexamethonium, decamethonium or the like, (iii) the groups wherein two of $R^1$–$R^4$ are said aliphatic hydrocarbon group and the remaining two are aralkyl group and mono or dialkylphenoxyalkyleneoxyalkyl group
diisobutylphenoxyethyleneoxyethyldimethylbenzylammonium (benzethonium), (diisobutyl)methylphenoxyethyleneoxyethyl dimethylbenzylammonium (methylbenzethonium) or the like (iv) the groups wherein one or two of $R^1$–$R^4$ are said aliphatic hydrocarbon group and the remaining two or three form a ring together with an adjacent nitrogen atom:
laurylpyridinium, cetylpyridinium, laurylisoquinolinium, laurylnicotinium, laurylquinaldinium or the like The DS value of CMC is 1.5 or more, preferably 1.7–2.95, more preferably 1.9–2.8.

In the quaternary ammonium salts of CMC of the present invention, those having a quaternary ammonium group with relatively smaller molecular weight are generally soluble in water but insoluble in organic solvents. For example, when the quaternary ammonium group is tetra-n-butylammonium, tetra-n-amylammonium, dimethyldibenzylammonium, triethylbenzylammonium, tri-n-butylbenzylammonium or the like, they are soluble in water but insoluble in polar organic solvents such as alcohols or acetone and non-polar organic solvents such as toluene. On the other hand, the salts having a quaternary ammonium group of relatively large molecular weight are generally insoluble in water but are soluble in various kinds of organic solvents, depending upon the kinds of the ammonium groups. For example, the salts of lauryltrimethylammonium, tetradecyldimethylbenzylammonium, stearyltrimethylammonium and like groups are insoluble in water but are soluble in methanol and ethanol. In the case where the trioctylmethyl ammonium group is contained, it is insoluble in water, but becomes soluble in methanol, ethanol and isopropanol when DS of CMC is 1.6 or more and further soluble in hydrocarbons such as toluene when DS is 2.0 or more. Also, the salt of the dimethyldistearylammonium group where DS is 2.84 is soluble in hydrocarbons such as benzene.

Also, the salt of a cyclic quaternary ammonium group such as the laurylpyridinium group is insoluble in water regardless of DS of CMC but is soluble in lower alcohols when DS is 2.5 or more.

As explained above, the present invention can provide the quaternary ammonium salts of CMC which are soluble in water and also in various organic solvents, selecting an appropriate quaternary ammonium qroup.

The quaternary ammonium salts of CMC in accordance with the present invention possess the characteristics of thickening property, colloid-protection property or the like as a soluble high molecular substance of CMC and of antistatic property, affinity with hair, sterility or the like as the property of the quaternary ammonium group. Therefore, they can be used for extensive fields, e.g., as thickening agents, antistatic agents, a material for cosmetic or bacteriostats or the like. Furthermore. the quaternary ammonium salts of CMC of the present invention will retain much characteristic of the quaternary ammonium group, compared with the known CMC quaternary ammonium salts, because the quaternary ammonium salts of the present invention are higher in DS value of CMC and much in an amount of quaternary ammonium group bonded.

The quaternary ammonium salts of CMC may be prepared by mixing and reacting a solution of CMC with DS of 1.5 or more or its salt with an appropriate quaternary ammonium compound or its solution and subjecting to isolation and purification.

CMC with DS of 1.5 or more used as the starting material in the above-mentioned process may be prepared by, for example, multi-stage etherification method as described in Japanese Patent Application Laid-Open No. 176202/1983. When CMC is used in a salt, it may be the alkali metal salt such as sodium or potassium salts, or the calcium salt, among which the sodium salt is preferable.

The quaternary ammonium compounds containing the formula of may be those in which the anion is a halide ion such as chloride ion, bromide ion or fluoride ion, or sulfate ion, nitrate ion or phosphate ion.

In the above process, CMC on its salt is put into an aqueous solution and then contacted with the quaternary ammonium compound. Especially it is preferred to add the quaternary ammonium compound or its aqueous solution to an aqueous solution of CMC salt.

The reaction is usually conducted at a temperature near room temperature.

The amount of the quaternary ammonium compound to be employed is preferably in an equivalent or excess to the carboxymethyl group, although it may be less than the equivalent amount.

The reaction mixture, when the resultant quaternary ammonium salt is water-soluble, is added into a hydrophilic solvent such as alcohol or acetone to precipitate and the precipitate is washed with a mixture of said solvent and water to remove the raw material of the quaternary ammonium compound. On the other hand, when the resultant is insoluble in water, the resultant precipitate is collected, well washed with water and dried.

The present invention is further illustrated by giving Examples, hereinafter. However, it should be noted that the present invention is not limited to these Examples.

A degree of substitution by carboxymethyl group per anhydrous glucose unit in CMC (DS) used in the following examples was determined as follows:

A degree of substitution by carboxymethyl group per anhydrous glucose unit of CMC (DS) used in the following examples was determined as follows:

One gram of CMC (calculated as being pure) was dissolved in a flask containing 200 ml of pure water and 100 ml of N/10 NaOH. Next, the excess of 10N NaOH was titrated with 10N $H_2SO_4$ using phenolphthalein as an indicator. The DS was calculated from the following equation based on the amount of titrant, B ml, added.

$$DS = \frac{162(100f_2 - Bf_1)}{1000 - 80(100f_2 - Bf_1)}$$

where
$f_1$: factor of 10N $H_2SO_4$
$f_2$: factor of 10N NaOH

Further, a degree of polymerisation of CMC sodium and the resulting quaternary ammonium salt (hereinafter referred to as "DP") was determined by osmometry of a solution of a sample in 0.1N NaCl.

The numerical value of the DP corresponds to $2 \times n$ wherein n means n in the formula of the salt of the present invention on page 3.

The DP of each of the quaternary ammonium salts prepared in following Examples was approximately the same as that of CMC sodium of its starting material.

EXAMPLE 1

To 200 g of 1% aqueous solution of each of CMC sodium with a variety of DS and viscosity was added 10% excess amount of each of the quaternary ammonium compounds. Acetone was added to the reaction mixture to yield a precipitate and it was washed with 90% aqueous acetone and then dried in vacuo at ordinary temperature to obtain a quaternary ammonium salt of CMC. Any of the obtained salts was soluble in water but insoluble in lower alcohols such as ethanol or the like.

(i) CMC sodium

| DS | DP | Viscosity of 1% aqueous solution (CPS) |
|---|---|---|
| 1.50 | 1100 | 2000 |
| 1.58 | 980 | 1600 |
| 1.94 | 550 | 276 |
| 2.41 | 480 | 203 |

-continued

| DS | DP | Viscosity of 1% aqueous solution (CPS) |
|---|---|---|
| 2.84 | 250 | 84 |

(ii) Quaternary Ammonium-Compound
Benzyltriethylammonium chloride
Benzyltri-n-butylammonium chloride
Tetra-n-butylammonium chloride
Tetra-n-amylammonium chloride
Dimethylbenzylammonium chloride

EXAMPLE 2

To 200 g of 1% aqueous solution of each of CMC sodium with a variety of DS was added 10% excess amount of each of the quaternary ammonium compounds with stirring. The resultant precipitate was filtered off, sufficiently washed with water and then dried in vacuo at ordinary temperature to obtain a quaternary ammonium salt of CMC. Solubility of these products is shown in Table 1.

The quaternary ammonium salt obtained in the same manner as mentioned above from dimethyl distearyl ammonium chloride and CMC sodium with a DS of 2.84 was soluble in hydrocarbons such as benzene or the like.

(i) CMC sodium

| DS | DP | Viscosity of 1% aqueous solution (cps) |
|---|---|---|
| 1.27 | 1000 | 1752 |
| 1.37 | 1000 | 1724 |
| 1.46 | 1050 | 1820 |
| 1.50 | 1100 | 2000 |
| 1.58 | 980 | 1600 |
| 1.94 | 550 | 276 |
| 2.41 | 480 | 203 |
| 2.84 | 250 | 84 |

TABLE 1

| Quaternary ammonium compound | Solvent | DS of CMC Sodium | | | | | | | |
|---|---|---|---|---|---|---|---|---|---|
| | | 1.27 | 1.37 | 1.46 | 1.50 | 1.58 | 1.74 | 2.41 | 2.84 |
| Lauryl pyridinium chloride | Water | X | X | X | X | X | X | X | X |
| | Methanol | X | X | X | X | X | X | X | O |
| | Ethanol | X | X | X | X | X | X | Δ | O |
| | IPA | X | X | X | X | X | X | O | O |
| | Acetone | X | X | X | X | X | X | X | X |
| | Toluene | X | X | X | X | X | X | X | X |
| Lauryl trimethyl ammonium chloride | Water | X | X | X | X | X | X | X | X |
| | Methanol | X | X | X | O | O | O | O | O |
| | Ethanol | X | X | X | X | O | O | O | O |
| | IPA | X | X | X | X | X | X | O | O |
| | Acetone | X | X | X | X | X | X | X | X |
| | Toluene | X | X | X | X | X | X | X | X |
| Tetradecyl dimethyl benzyl ammonium chloride | Water | X | X | X | X | X | X | X | X |
| | Methanol | X | Δ | Δ | O | O | O | O | O |
| | Ethanol | X | X | X | X | O | O | O | O |
| | IPA | X | X | X | X | O | O | O | O |
| | Acetone | X | X | X | X | X | X | X | X |
| | Toluene | X | X | X | X | X | X | X | X |
| Trioctyl methyl ammonium chloride | Water | X | X | X | X | X | X | X | X |
| | Methanol | X | X | X | X | O | O | O | O |
| | Ethanol | X | X | X | X | O | O | O | O |
| | IPA | X | X | X | X | Δ | O | O | X |
| | Acetone | X | X | X | X | X | Δ | O | O |
| | Toluene | X | X | X | X | X | Δ | O | O |
| Stearyl trimethyl ammonium chloride | Water | | | X | X | X | X | X | X |
| | Methanol | | | O | O | O | O | O | O |
| | Ethanol | | | X | Δ | O | O | O | X |
| | IPA | | | X | X | X | X | X | X |
| | Acetone | | | X | X | X | X | X | X |

TABLE 1-continued

| Quaternary ammonium compound | Solvent | DS of CMC Sodium | | | | | | | |
|---|---|---|---|---|---|---|---|---|---|
| | | 1.27 | 1.37 | 1.46 | 1.50 | 1.58 | 1.74 | 2.41 | 2.84 |
| | Toluene | | | X | X | X | X | X | X |

Note:
X: insoluble,
Δ: partially soluble with gel,
O: soluble

FIGS. 1–7 show infrared absorption spectra of seven quaternary ammonium salts of CMC prepared in the above Examples 1 and 2.

Figure 1:
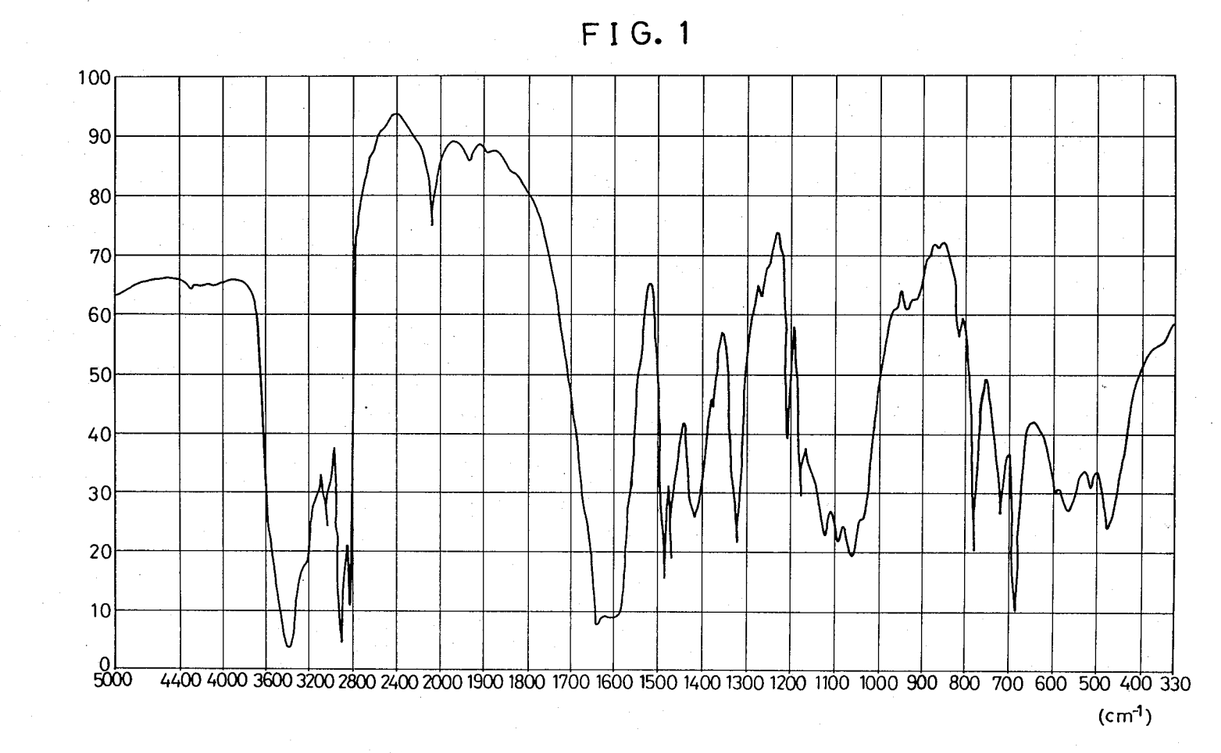
FIGS. 1-12 show infrared absorption spectra of the quaternary ammonium salts of CMC of the present invention.

FIG. 1 Laurylpyridinium CMC (DS of CMC sodium: 2.84)

The absorption at 3050 cm$^{-1}$ to aromatic C—H stretching vibration, the absorption at 1600 cm$^{-1}$ to —COO$^-$ carboxylic acid C=O stretching vibration, the absorptions at 2900 and 2850 cm$^{-1}$ to C—H of —CH$_2$— stretching vibrations, the absorptions at 690 and 720 cm$^{-1}$ to monosubstituted pyridine structure vibration, and the absorptions at 980–1170 cm$^{-1}$ to cellulose C—O stretching vibration and glucose ring vibration.

Figure 2:
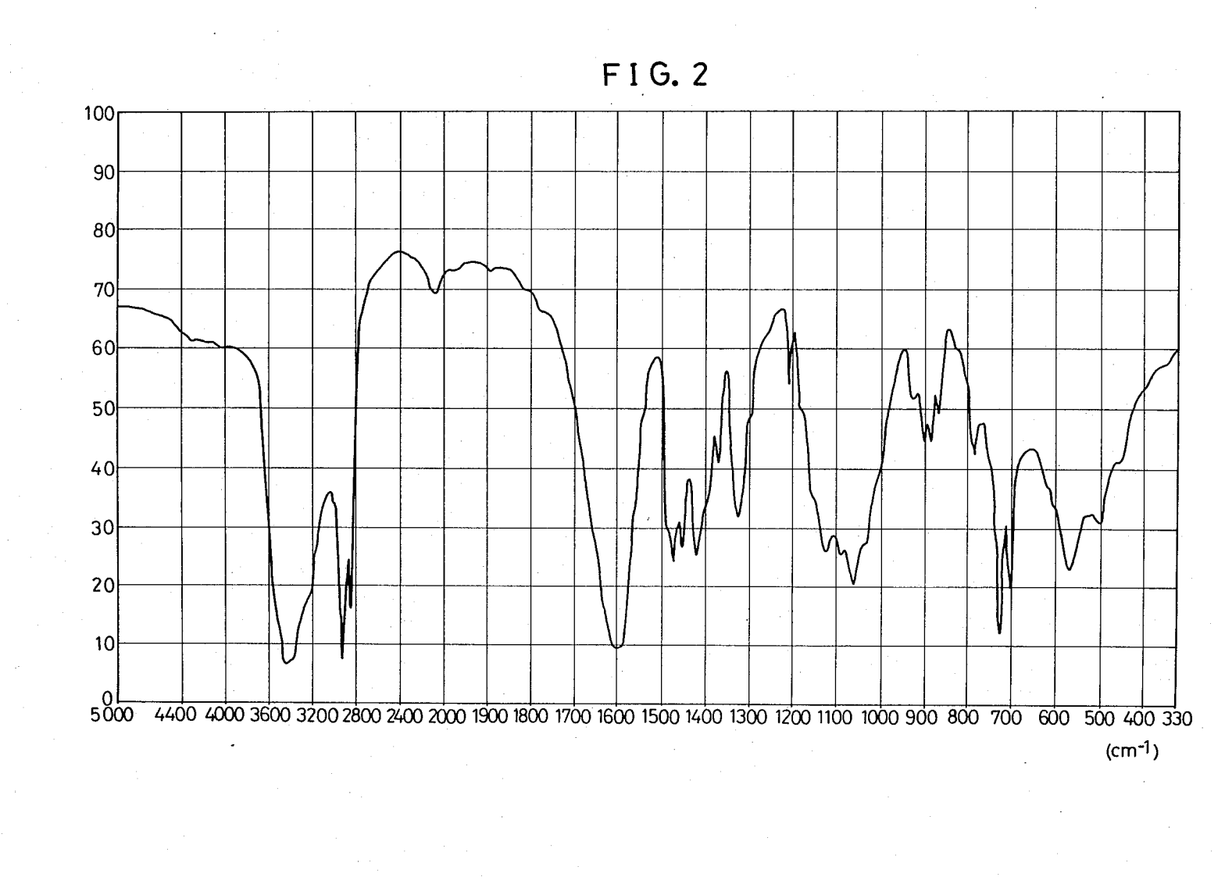

FIG. 2 Tetradecyl dimethyl benzyl ammonium CMC (DS of CMC sodium: 2.41)

The absorption at 1600 cm$^{-1}$ to —COO$^-$ carboxylic acid C=O stretching vibration, the absorptions at 2900 and 2850 cm$^{-1}$ to —CH$_2$—, the absorptions of 710 and 730 cm$^{-1}$ to monosubstituted phenyl group, and the absorption at 980–1170 cm$^{-1}$ to cellulose C—O stretching vibration and glucose ring vibration.

Figure 3:
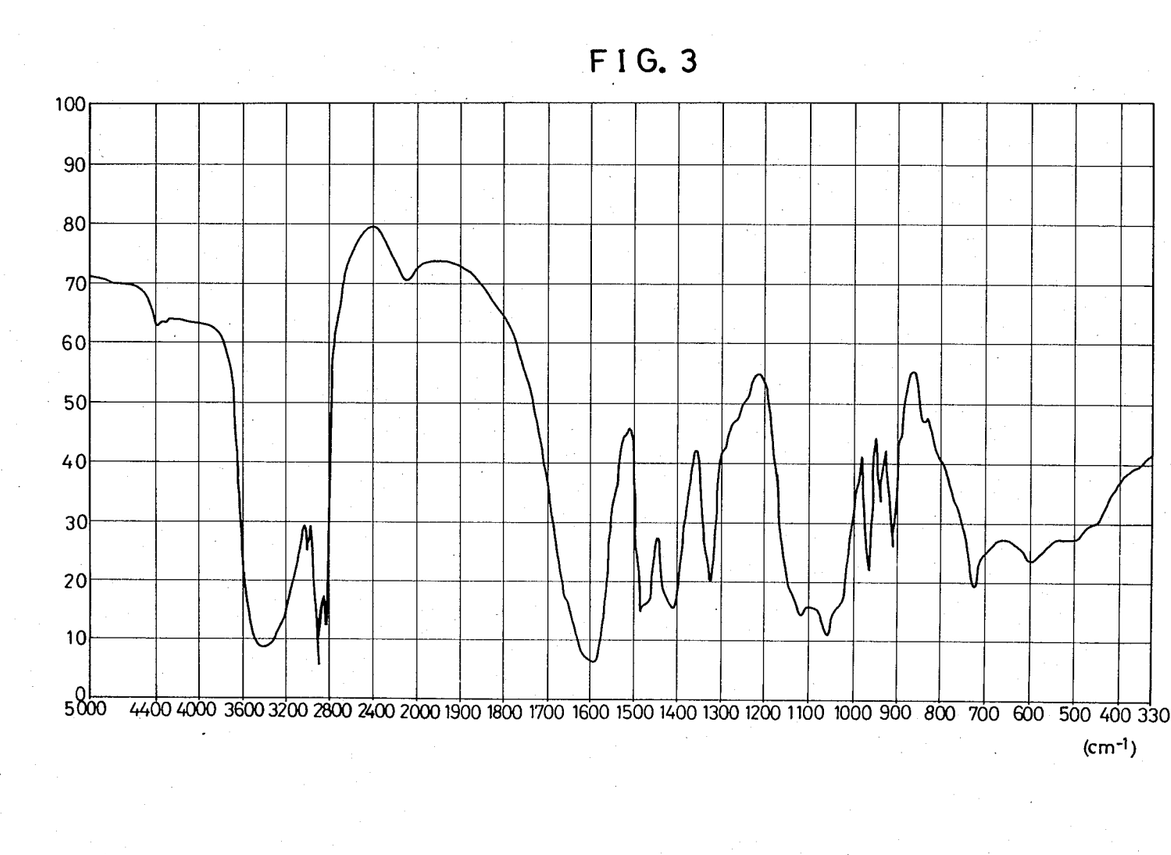

FIG. 3 Lauryl trimethyl ammonium CMC (DS of CMC sodium: 1.94)

The absorption at 1600 cm$^{-1}$ to —COO$^-$, the absorption at 2900 and 2850 cm$^{-1}$ to —CH$_2$—, and the absorption at 980–1170 cm$^{-1}$ to cellulose C—O stretching vibration and glucose ring vibration.

Figure 4:
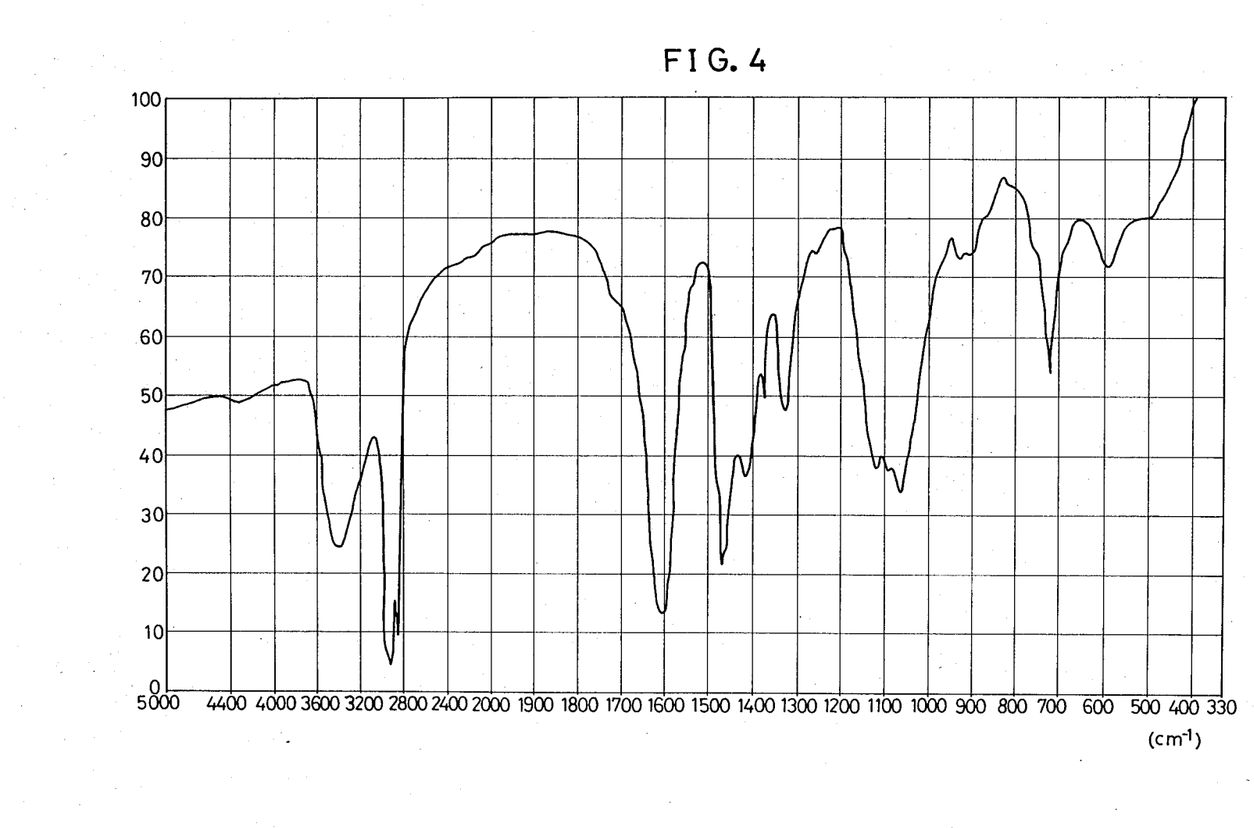

FIG. 4 Trioctyl methyl ammonium CMC (DS of CMC—Na: 2.41)

The absorption at 1600 cm$^{-1}$ to —COO$^-$, the absorption at 2900 and 2850 cm$^{-1}$ to —CH$_2$—, and the absorption at 1000–1170 cm$^{-1}$ to cellulose C—O stretching vibration and glucose ring vibration.

Figure 5:
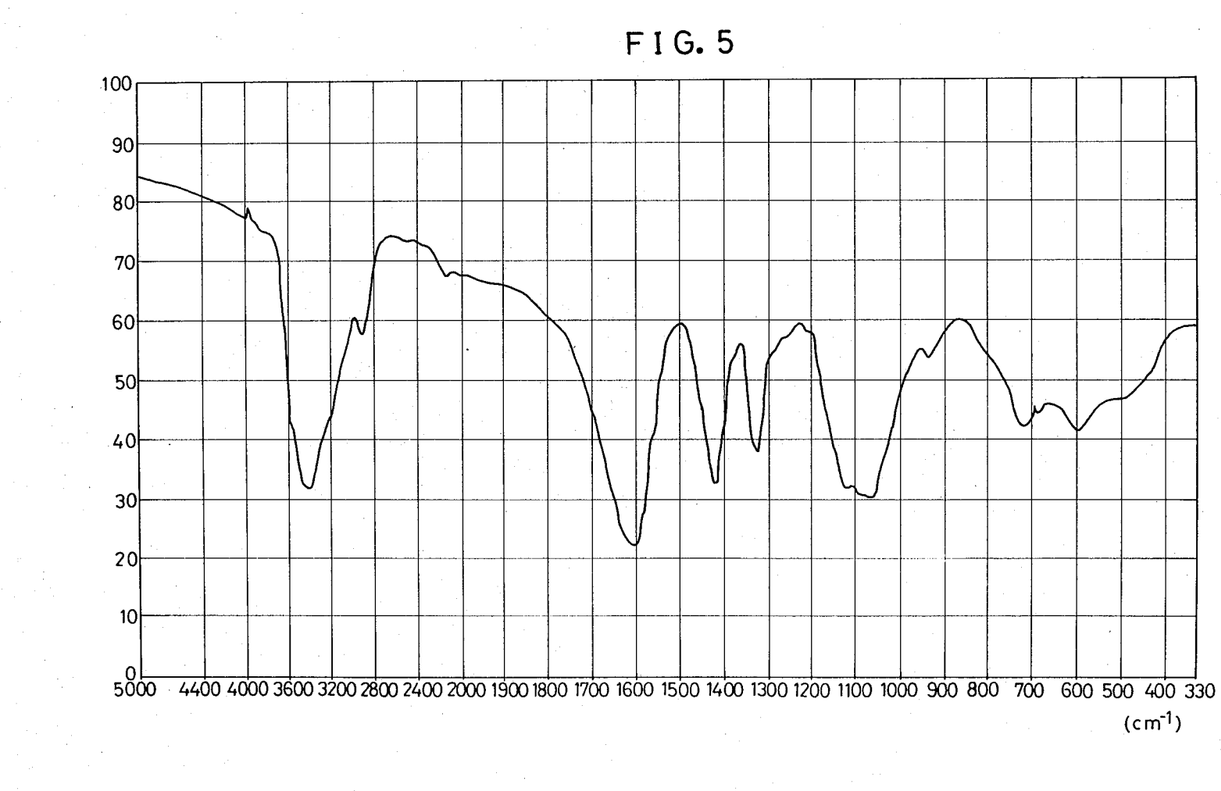

FIG. 5 Tetra-n-butyl ammonium CMC (DS of CMC—Na: 2.84)

The absorption at 1600 cm$^{-1}$ to —COO$^-$, the absorption at 2930 cm$^{-1}$ to —CH$_2$—, and the absorption at 1000–1170 cm$^{-1}$ to cellulose C—O stretching vibration and glucose ring vibration.

Figure 6:
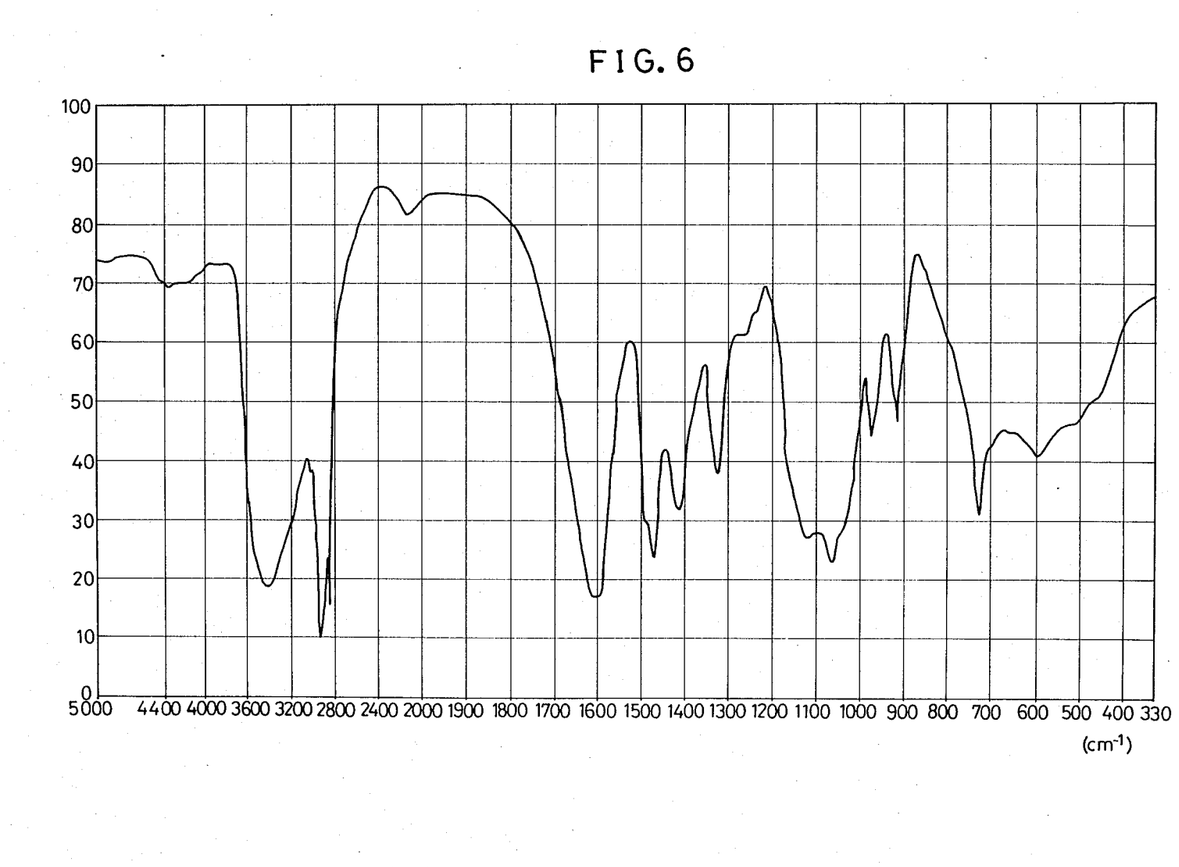

FIG. 6 Stearyl trimethyl ammonium CMC (DS of CMC—Na: 1.58)

The absorption at 1600 cm$^{-1}$ to —COO$^-$, the absorption at 2920 and 2850 cm$^{-1}$ to —CH$_2$—, and the absorption at 980–1170 cm$^{-1}$ to cellulose C—O stretching vibration and glucose ring vibration.

Figure 7:
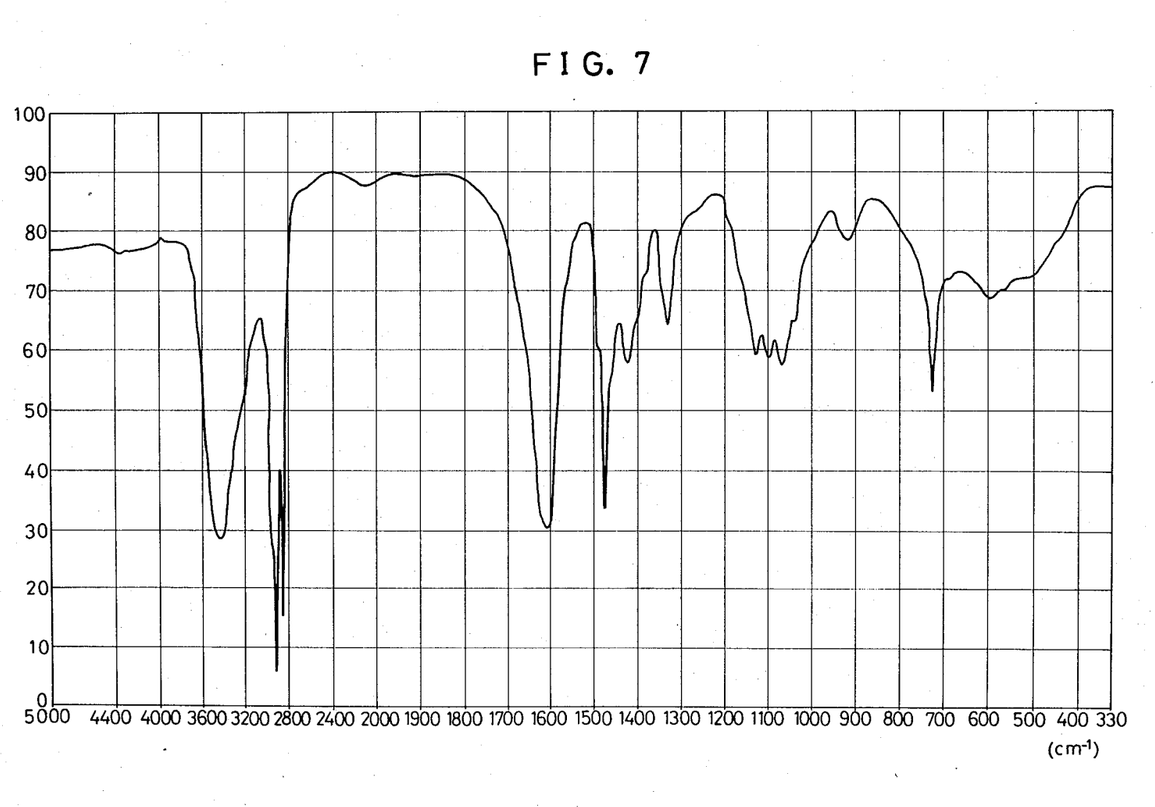

FIG. 7 Dimethyl distearyl ammonium CMC (DS of CMC—Na: 2.84)

The absorption at 1610 cm$^{-1}$ to —COO$^-$, the absorption at 2940 and 2870 cm$^{-1}$ to —CH$_2$—, and the absorption at 1000–1170 cm$^{-1}$ to cellulose C—O stretching vibration and glucose ring vibration.

EXAMPLE 3

To 200 g of 1% aqueous solution of following CMC sodium was added an equivalent amount of each of quaternary ammonium compounds and stirred. The resultant precipitate was filtered off, sufficiently washed with water and dried in vacuo at ordinary temperature to obtain a corresponding quaternary ammonium salt. Solubility of these salts is shown in Table 2, and any of them was insoluble in water.

(i) CMC Sodium

| DS | DP | Viscosity of 1% aqueous solution (cps) |
|---|---|---|
| 2.41 | 700 | 610 |

(ii) Quaternary Ammonium Compound.
Benzethonium chloride
Methylbenzethonium chloride
Cetylpyridium chloride

TABLE 2

| Quatenary ammonium compound | Solvent | | | | | | |
|---|---|---|---|---|---|---|---|
| | Ethanol | Aqueous ethanol | | | | Methanol | Isopropanol |
| | | 90% | 80% | 70% | 60% | | |
| Benzethonium chloride | O | O | O | Δ | X | O | O |
| Methylbenzethonium chloride | O | O | O | Δ | X | O | O |
| Cetyl pyridinium chloride | O | O | Δ | X | X | O | — | O |

Note: The meanings of the marks O, Δ and X are the same as those in Table 1

Figure 8:
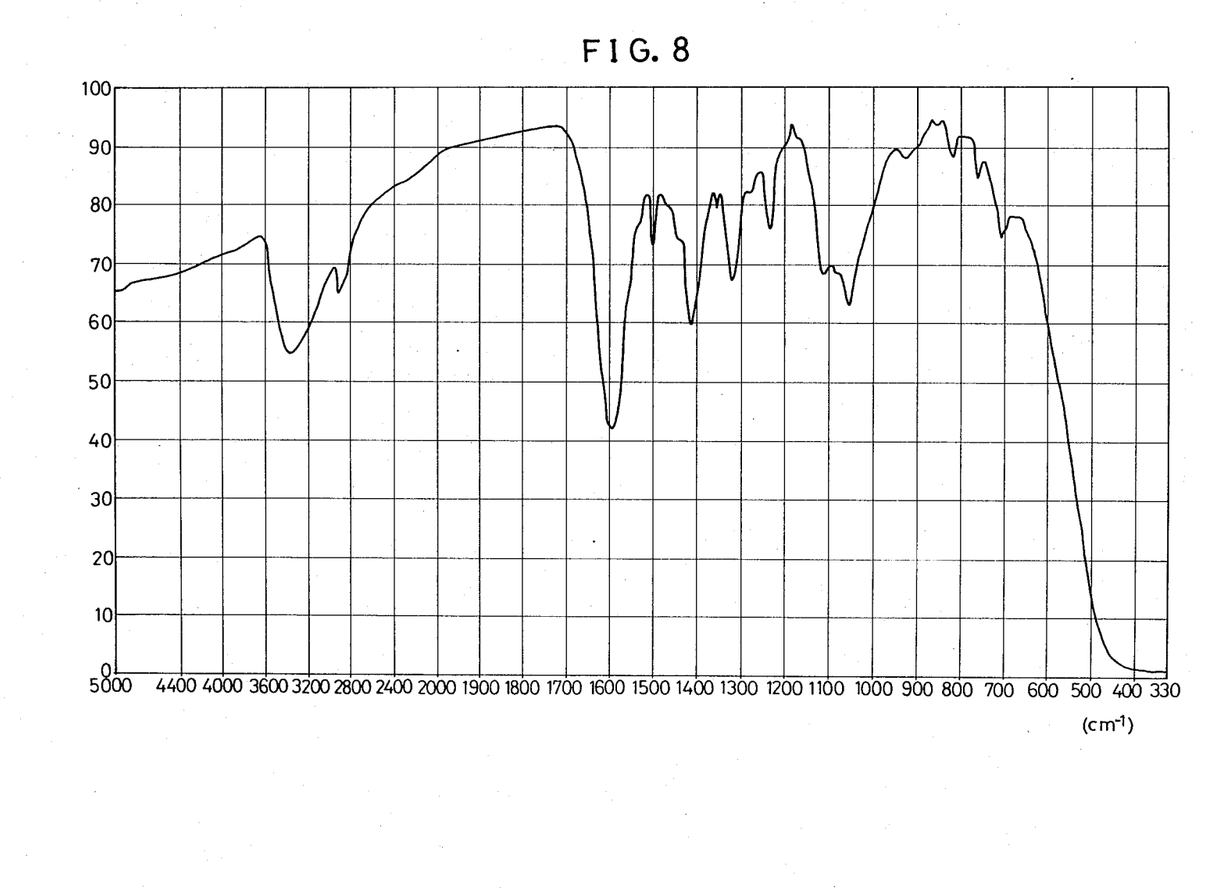
Figure 9:
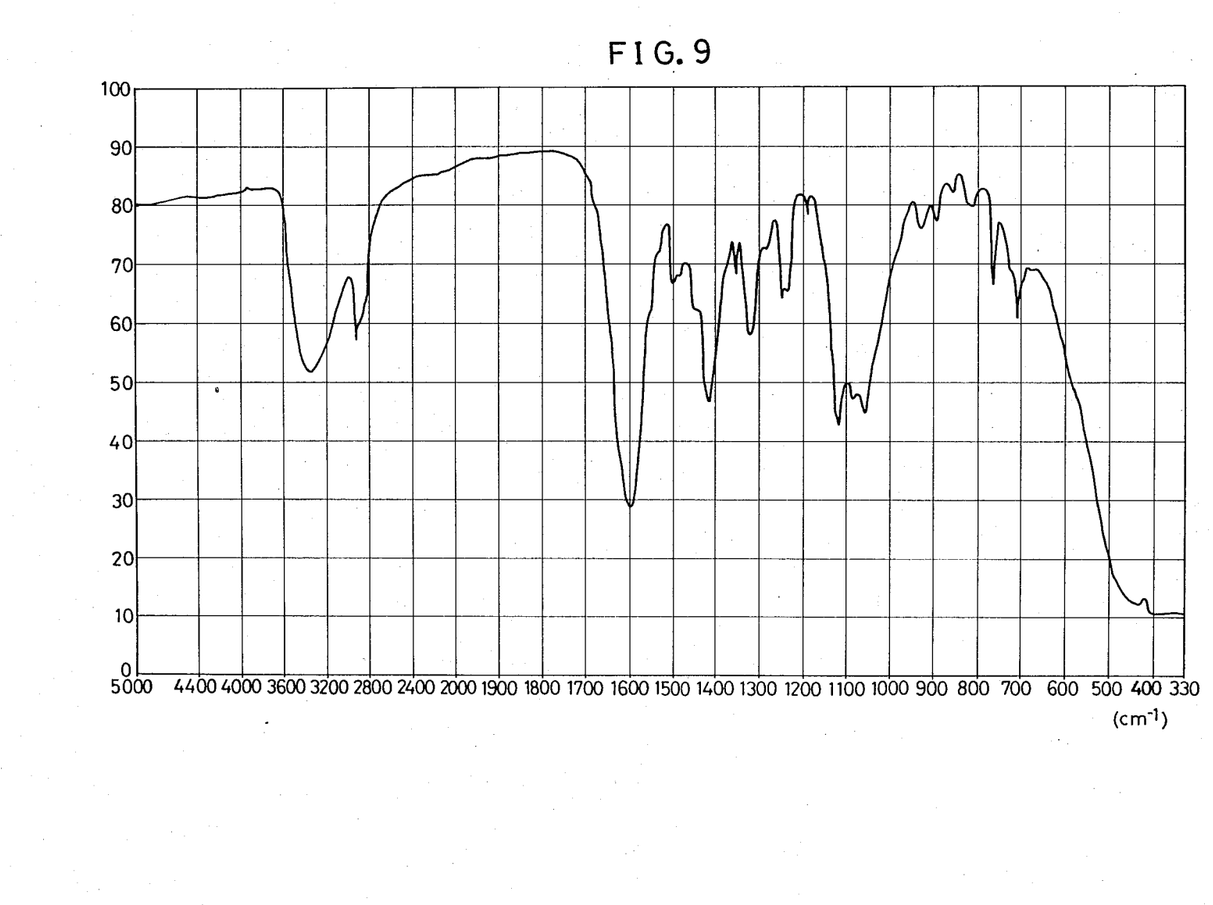
Figure 10:
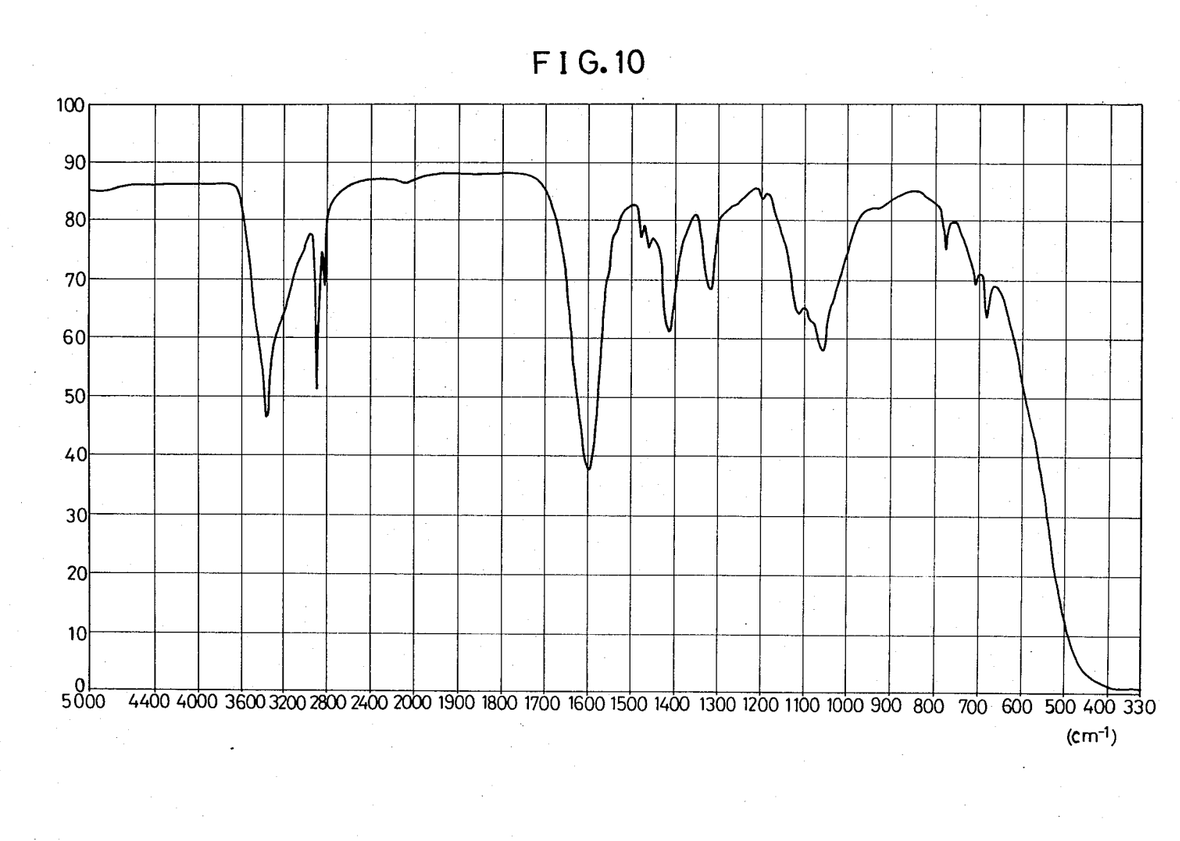

FIGS. 8–10 show infrared absorption spectra of three quaternary ammonium salts of CMC prepared in the above Example 3.

FIG. 8 Benzethonium CMC (DS of CMC Na=2.41)

The absorption at 1610 cm$^{-1}$ to —COO$^-$, the absorption at 830 cm$^{-1}$ to 1,4 substituted phenyl, the absorption at 700–770 cm$^{-1}$ to monosubstituted phenyl and the absorption at 980–1170 cm$^{-1}$ to cellulose C—O stretching vibration and glucose ring vibration.

FIG. 9 Methylbenzethonium CMC (DS of CMC Na=2.41)

The absorption at 1610 cm$^{-1}$ to —COO$^-$, the absorption at 700–770 cm$^{-1}$ to monosubstituted phenyl, and the absorption at 980–1170 cm$^{-1}$ to cellulose C—O stretching vibration and glucose ring vibration.

FIG. 10 Cetylpyridinium CMC (DS of CMCNa=2.41)

The absorption at 1600 cm$^{-1}$ to —COO$^-$, the absorption at 2900 and 2850 cm$^{-1}$ to C—H of —CH$_2$— stretching vibration, the absorption at 690 and 720 cm$^{-1}$ to mono substituted pyridine structure vibration, and the absorption at 980–1170 cm$^{-1}$ to cellulose C—O stretching vibration and glucose ring vibration.

EXAMPLE 4

To 200 g of 1% aqueous solution of following CMC sodium was added equivalent amount of each of following quaternary ammonium compounds and stirred. Acetone was added to the reaction mixture to yield a precipitate and it was washed with 90% aqueous acetone and dried in vacuo at ordinary temperature to obtain corresponding quaternary ammonium salts.

All the resultants were soluble in water but did not completely dissolve in lower alcohols such as ethanol.

(i) CMC sodium

| DS | DP | Viscosity of 1% aqueous solution (cps) |
|---|---|---|
| 2.41 | 700 | 610 |

Figure 11:
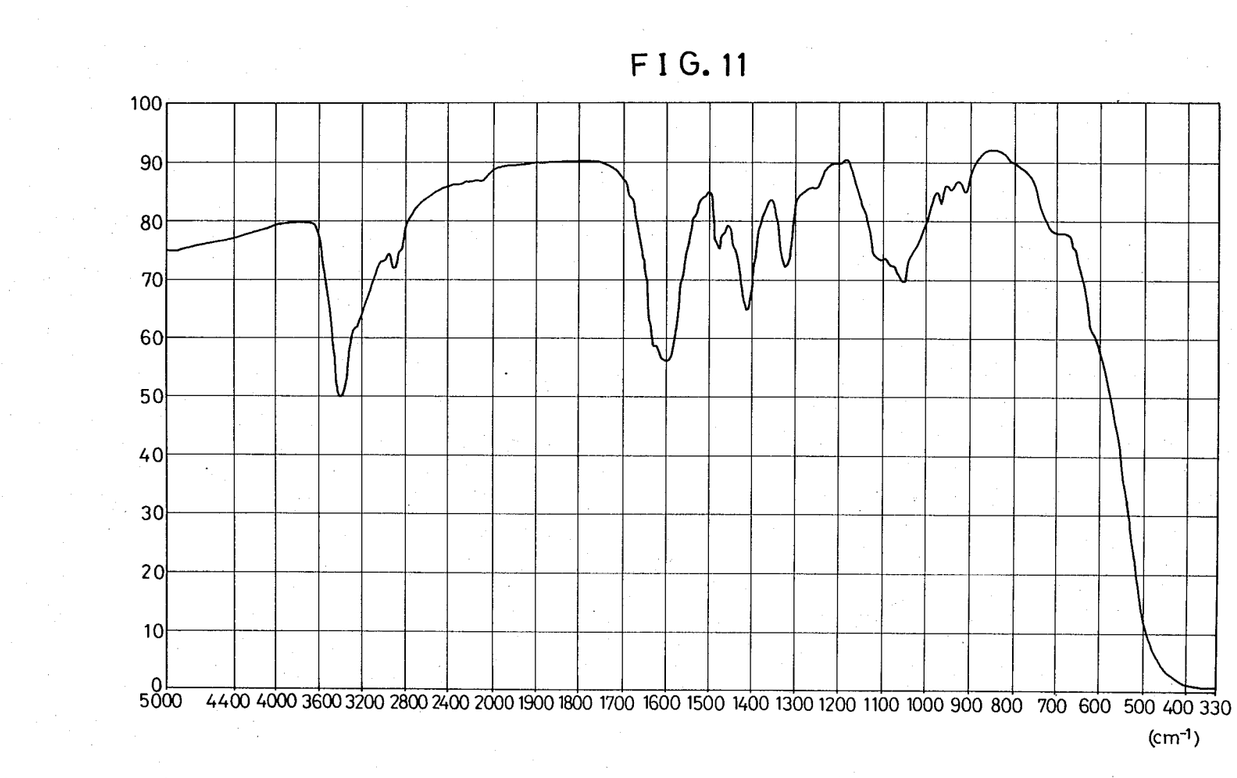
Figure 12:
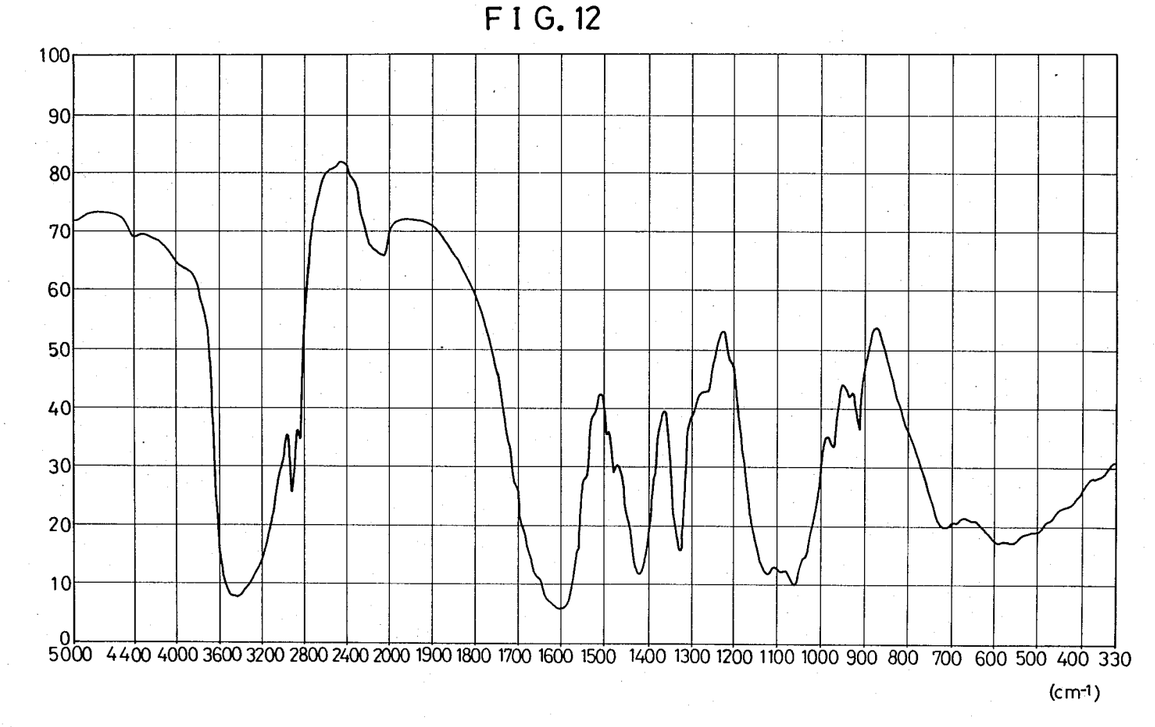
Figure 13:
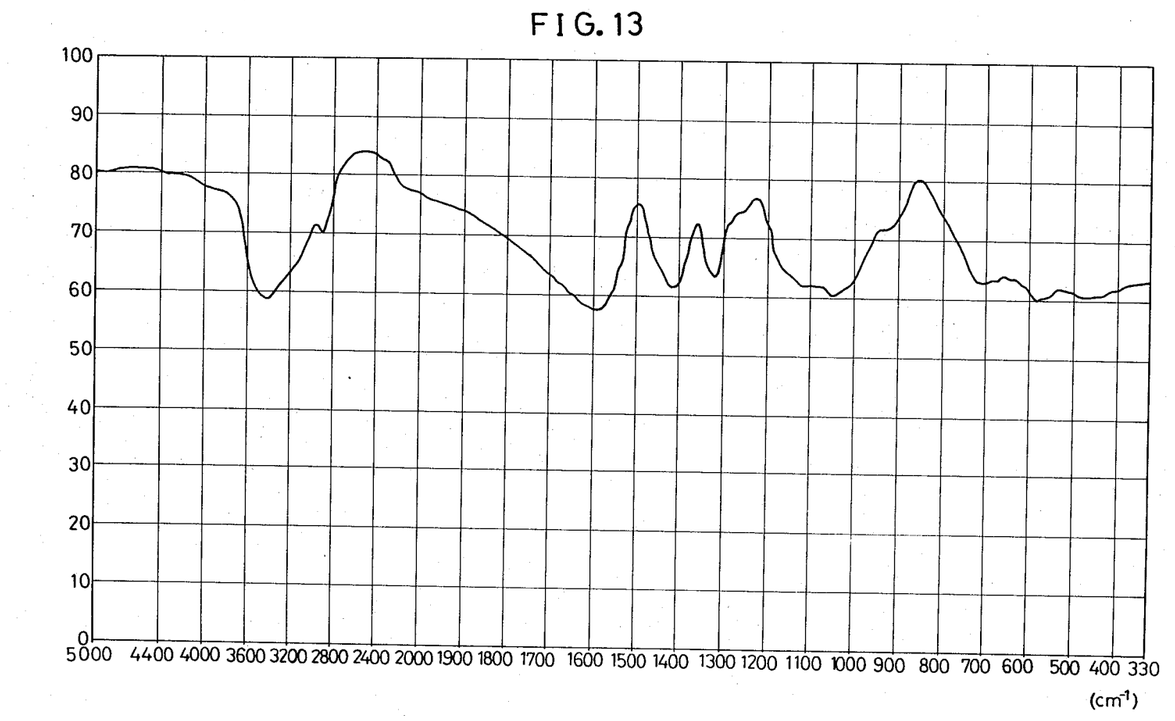
FIG. 13 shows infrared absorption spectrum of CMC (DS=2.41).

(ii) Quaternary ammonium compounds
Hexamethonium chloride
Decamethonium chloride FIGS. 11 and 12 show infrared absorption spectra of two quaternary ammonium salts of CMC prepared in Example 4.

FIG. 11 Hexamethonium CMC

The absorption at 1600 cm$^{-1}$ to —COO$^-$, the absorption at 2930 cm$^{-1}$ to —CH$_2$—, and the absorption at 1000-1170 cm$^{-1}$ to cellulose C—O stretching vibration and glucose ring vibration FIG. 12 Decamethonium CMC

The absorption at 1600 cm$^{-1}$ to —COO$^-$, the absorption at 2930 cm$^{-1}$ to —CH$_2$—, and the absorption at 1000-1170 cm$^{-1}$ to cellulose C—O stretching vibration and glucose ring vibration

What is claimed is:

1. A quaternary ammonium salt of carboxymethylcellulose having the formula:

wherein R is a hydrogen atom or a quaternary ammonio carboxymethyl group, and n is an integer from 10 to 1000, provided that a degree of substitution by carboxymethyl group per anhydrous glucose unit in said carboxymethylcellulose is 1.5 or more and the quaternary ammonio carboxymethyl group has the subformula:

where (i) $R^1$-$R^4$ are each a C$_{1-20}$ straight chained or branched and saturated or unsaturated aliphatic hydrocarbon group, (ii) three of $R^1$-$R^4$ are each said hydrocarbon group, and the remaining one is an aralkyl group or trialkylammoniumalkyl group, (iii) two of $R^1$-$R^4$ are said hydrocarbon group and the remaining two are an aralkyl group and mono- or dialkylphenoxyalkyleneoxy alkyl group, or (iv) one or two of $R^1$-$R^4$ are said hydrocarbon group and the remaining two or three form a ring together with an adjacent nitrogen atom.

2. The quaternary ammonium salt of carboxymethylcellulose according to claim 1 wherein a degree of substitution by carboxymethyl group per anhydrous glucose unit in said carboxymethylcellulose is 1.7–2.95.

3. The quaternary ammonium salt of carboxymethylcellulose according to claim 1 wherein a degree of substitution by carboxymethyl group per anhydrous glucose unit in said carboxymethylcellulose is 1.9–2.8.

4. The quaternary ammonium salt of carboxymethylcellulose according to claim 1 wherein any of $R^1$-$R^4$ is an n-butyl or n-amyl group.

5. The quaternary ammonium salt of carboxymethylcellulose according to claim 1 wherein three of any of $R^1$-$R^4$ is a methyl group, and the remaining one is lauryl or stearyl group.

6. The quaternary ammonium salt of carboxymethylcellulose according to claim 1, wherein three of the $R^1$-$R^4$ groups are octyl, and the remaining one is a methyl group.

7. The quaternary ammonium salt of carboxymethylcellulose according to claim 1, wherein two of the $R^1$-$R^4$ groups are methyl and either of the ramaining $R^1$-$R^4$ groups is stearyl.

8. The quaternary ammonium salt of carboxymethylcellulose according to claim 1, wherein three of the $R^1$-$R^4$ groups are methyl, ethyl or n-butyl; or one of the $R^1$-$R^4$ groups is tetradecyl, two of the $R^1$-$R^4$ groups are methyl, and one of the $R^1$-$R^4$ groups is benzyl, trimethylammoniumhexyl or trimethylammonium decamethyl.

9. The quaternary ammonium salt of carboxymethylcellulose according to claim 1, wherein two of the $R^1$-$R^4$ groups are methyl, and the remaining two groups are benzyl and diisobutylphenoxyethyleneoxyethyl or (diisobutyl) methylphenoxyethyleneoxyethyl.

10. The quaternary ammonium salt of carboxymethylcellulose according to claim 1, wherein one of the $R^1$-$R^4$ groups is n-cetyl or lauryl and the remaining three groups form a pyridinium group together with an adjacent nitrogen atom.

* * * * *

UNITED STATES PATENT AND TRADEMARK OFFICE
CERTIFICATE OF CORRECTION

PATENT NO. : 4,617,385

DATED : October 14, 1986

INVENTOR(S) : Hajime Namikoshi et al.

It is certified that error appears in the above-identified patent and that said Letters Patent is hereby corrected as shown below:

Column 2, line 17: "$R^{1-R4}$" should read $-R^1-R^4-$

Column 3, line 13: "group" should read --group:--

Column 4, lines 57-59 should be deleted

Column 4, line 61: "CMC" (DS)" should read --CMC sodium (DS)--

Column 4, line 62: "was determined as follows:" should read ---was determined.--

Column 5, line 63- column 5, line 7, should be deleted

Signed and Sealed this

Tenth Day of November, 1987

Attest:

DONALD J. QUIGG

Attesting Officer

Commissioner of Patents and Trademarks